(12) United States Patent
Hyun et al.

(10) Patent No.: US 9,611,986 B2
(45) Date of Patent: Apr. 4, 2017

(54) LED LIGHT-DIFFUSING LENS ADOPTING ASYMMETRIC FREE-FORM SURFACE EXPRESSION

(71) Applicants: Dong Hoon Hyun, Siheung-si (KR); Myeung Jae Noh, Uiwang-si (KR)

(72) Inventors: Dong Hoon Hyun, Siheung-si (KR); Myeung Jae Noh, Uiwang-si (KR)

(*) Notice: Subject to any disclaimer, the term of this patent is extended or adjusted under 35 U.S.C. 154(b) by 24 days.

(21) Appl. No.: 14/415,801

(22) PCT Filed: Jul. 16, 2013

(86) PCT No.: PCT/KR2013/006336
§ 371 (c)(1),
(2) Date: Mar. 10, 2015

(87) PCT Pub. No.: WO2014/014249
PCT Pub. Date: Jan. 23, 2014

(65) Prior Publication Data
US 2015/0192256 A1    Jul. 9, 2015

(30) Foreign Application Priority Data

Jul. 20, 2012  (KR) .................... 10-2012-0079105

(51) Int. Cl.
*F21V 5/04*    (2006.01)
*F21K 99/00*   (2016.01)
(Continued)

(52) U.S. Cl.
CPC ............ *F21K 9/50* (2013.01); *F21K 9/60* (2016.08); *F21V 5/04* (2013.01); *F21V 5/08* (2013.01);
(Continued)

(58) Field of Classification Search
CPC ..................................... F21V 5/04; F21V 5/08
USPC .................................................. 362/329, 335
See application file for complete search history.

(56) References Cited

U.S. PATENT DOCUMENTS

2008/0239722 A1* 10/2008 Wilcox ............... F21V 5/04
                                                362/268
2010/0073937 A1*  3/2010 Ho .................... F21V 5/04
                                                362/335
(Continued)

FOREIGN PATENT DOCUMENTS

JP    2007157686      6/2007
KR     101109581   *  1/2012  ............ F21V 5/04
WO  WO2012074208      6/2012

OTHER PUBLICATIONS

ESPACENET English Machine Translation and English Abstract of KR 101109581.*
(Continued)

*Primary Examiner* — Jong-Suk (James) Lee
*Assistant Examiner* — Zheng Song
(74) *Attorney, Agent, or Firm* — Stetina Brunda Garred & Garred

(57) ABSTRACT

A light-diffusing LED lens adopting an asymmetric free-form surface expression is provided to improve the uniformity ratio of illumination of the target region by controlling the light from the LED serving as a light source. The light-diffusing LED lens adopting an asymmetric free-form surface expression exhibits light control and illumination efficiency suitable for highway environment conditions and characteristics of traffic lanes. Both the light incident surface and the light emitting surface of the light-diffusing LED lens are formed into an aspherical surface, in which an asymmetrical free-form surface is optimally utilized to enable the free-form surface to be freely modified and changed by adjusting the coefficients of the aspherical surface or the like. The light-diffusing LED lens enables a numerical design and a mathematical design by means of the free-form surface, and enables a fine control to be performed by numerical control to thus improve accuracy of light control.

3 Claims, 9 Drawing Sheets

(51) Int. Cl.
*F21V 5/08* (2006.01)
*G02B 3/02* (2006.01)
*G02B 19/00* (2006.01)
*F21K 9/60* (2016.01)
*F21Y 115/10* (2016.01)
*F21Y 101/00* (2016.01)

(52) U.S. Cl.
CPC ............ *G02B 3/02* (2013.01); *G02B 19/0014* (2013.01); *G02B 19/0061* (2013.01); *F21Y 2101/00* (2013.01); *F21Y 2115/10* (2016.08)

(56) References Cited

U.S. PATENT DOCUMENTS

| | | | | |
|---|---|---|---|---|
| 2011/0235338 | A1* | 9/2011 | Chen | F21V 5/04 |
| | | | | 362/311.02 |
| 2011/0320024 | A1* | 12/2011 | Lin | F21V 5/04 |
| | | | | 700/98 |
| 2012/0050889 | A1 | 3/2012 | Lu et al. | |
| 2012/0051047 | A1* | 3/2012 | Lu | G02B 19/0066 |
| | | | | 362/235 |
| 2013/0258676 | A1* | 10/2013 | Hyun | F21V 5/04 |
| | | | | 362/309 |

OTHER PUBLICATIONS

Extended European Search Report, 8 pages, Apr. 3, 2016, Application No. 13820607.

\* cited by examiner (a)

(b)

LED LIGHT-DIFFUSING LENS ADOPTING ASYMMETRIC FREE-FORM SURFACE EXPRESSION

CROSS-REFERENCE TO RELATED APPLICATIONS

The present application claims priority to PCT International Application No. PCT/KR2013/006336 filed Jul. 16, 2013, which claims priority to Korean Patent Application No. 10-2012-0079105 filed Jul. 20, 2014, the entirety of the disclosures of which are expressly incorporated herein by reference.

STATEMENT RE: FEDERALLY SPONSORED RESEARCH/DEVELOPMENT

Not Applicable

BACKGROUND

Technical Field

The present disclosure relates to an LED light-diffusing lens for an LED street lamp which adopts an asymmetric free curved surface equation. More particularly, the present disclosure relates to an LED light-diffusing lens adopting an asymmetric free curved surface equation, in which the asymmetric free curved surface equation is applied to the LED light-diffusing lens to improve an uniformity ratio of illumination, and in particular to control an LED light source to exhibit all the functions as an LED street lamp suitable for peripheral environments and traffic lanes of a highway, and a highway LED street lamp can be placed on the market.

Background Art

Light Emitting Diodes (LEDs) are becoming more frequently employed as light sources in the industrial world including the lighting installation field for energy saving. Thus, research for effectively and efficiently using LEDs has also actively been conducted in each industrial field.

However, since an LED light source is characterized in that a rectilinearly advancing property of light is high, the light energy radiation form of the LED, which is similar to a point light source, typically takes a form of Gaussian distribution in which the light distribution concentrates to the central portion as compared to the peripheral portions, as illustrated in FIG. 1. However, this may cause a glaring phenomenon and may contribute to light pollution due to twinkling since the central light is excessively intensive as compared to the peripheral light.

Optical lenses, which are coupled to an LED side so as to diffuse and adjust the light distribution of the LED have been developed in order to remedy the disadvantages of the glaring phenomenon and the light pollution caused by the central concentration of the light.

Most LED light-diffusing lenses can perform light-adjustment to convert the LED as a point light source into a plane light source through the light diffusion. However, the radiation form of the LED subjected to the light adjustment takes a form of Lambertian distribution, as illustrated in FIG. 2, in which the central light still intensively acts as compared to the peripheral light. Thus, even brightness cannot be derived, and, as a result, the existing LED light-diffusing lenses are unsatisfactory for light diffusion adjustment of an LED light source.

That is, the twinkling problem due to the central concentration of light still exists so that the glaring phenomenon cannot be eliminated. Further, light adjustment efficiency is very poor. This means that there is considerable difficulty in adjusting emitted light of the LED, such as light diffusion.

Meanwhile, due to their various advantages, LEDs are variously utilized increasingly in various industrial fields for indoor lighting, outdoor lighting, backlight or the like, and the LED market is spreading.

Although light distribution adjustment suitable for use of each LED and stable optical characteristics obtained therefrom are sought after, conventionally developed and proposed light-diffusing LED optical lenses merely induce light diffusion with respect to emitted light of LEDs and perform light adjustment to induce light diffusion in any one of an X-axis direction and a Y-axis direction, regardless of characteristics of each use. Accordingly, the conventional light-diffusing LED optical lenses cannot derive the maximum illumination efficiency and energy efficiency according to an extraordinary nature for each use. In order to overcome this disadvantage, there has been research and development with great interest in illumination efficiency and energy efficiency for LED light sources.

In addition, LED lighting employing an LED as a light source is widely applied to ordinary street lamps, security lights, or tunnel lights, for example. However, highway LED lighting solutions do not exist.

Furthermore, to say nothing of currently operated highway street lamps, ordinary LED street lamps, even if they were to be applied as highway street lamps merely by changing the use thereof, may cause drivers to become tired due to a low uniformity ratio of illumination of LED lighting (a level of uniform distribution of light in a predetermined space) and may lead to unsafe driving conditions for vehicles traveling at high speed on the highways.

BRIEF SUMMARY

Technical Problem

The present disclosure relates to a light-diffusing lens for an LED, which was made in consideration of the problems described above. Various embodiments of the present disclosure provide an LED light-diffusing lens adopting an asymmetric free curved surface equation, in which the asymmetric free curved surface equation is applied to the LED light-diffusing lens to improve an uniformity ratio of illumination (a level of uniform distribution of light in a predetermined space) according to a light control, and in particular to perform light control so as to exhibit all the functions of an LED street lamp suitable for peripheral environments and traffic lanes of a highway, with the result that a highway LED street lamp can be placed on the market.

Various embodiments of the present disclosure provide an LED light-diffusing lens adopting an asymmetric free curved surface equation, in which the LED light-diffusing lens is configured to be capable of: controlling light adjustment of an LED light source in all directions on the X- and Y-axis so that the LED light-diffusing lens may serve as a diffuser that performs light radiation adjustment in all directions; providing a plane light source solution suitable for characteristics of a highway; and simplifying maintenance.

Various embodiments of the present disclosure provide an LED light-diffusing lens adopting an asymmetric free curved surface equation, in which the LED light-diffusing lens is configured to utilize a free curved surface while being provided with aspheric surfaces on both of inner and outer surfaces thereof, e.g., so that even a fine control by a numerical control may be enabled to enhance precision according to a light control and/or to increase an uniformity ratio of illumination with respect to a target region of an irradiated surface of a highway so that illumination efficiency and energy efficiency can be enhanced.

Embodiments of the present disclosure are intended to provide an LED light-diffusing lens adopting an asymmetric free curved surface equation in which the LED light-diffusing lens is configured to improve lighting for visibility of the highway, e.g., to prevent drivers from becoming tired while driving and/or to improve safety while traveling.

BRIEF DESCRIPTION OF THE DRAWINGS

These and other features and advantages of the various embodiments disclosed herein will be better understood with respect to the following description and drawings, in which like reference numerals refer to like parts throughout, and in which.

DETAILED DESCRIPTION

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

Technical Solution

Figure 4:
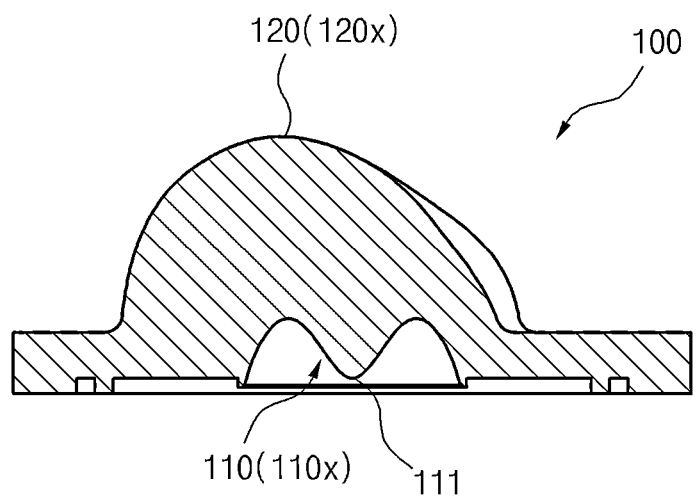
FIG. 4 is a cross-sectional view of the LED light-diffusing lens of the present disclosure which is taken along line X-X in FIG. 3.
Figure 5:
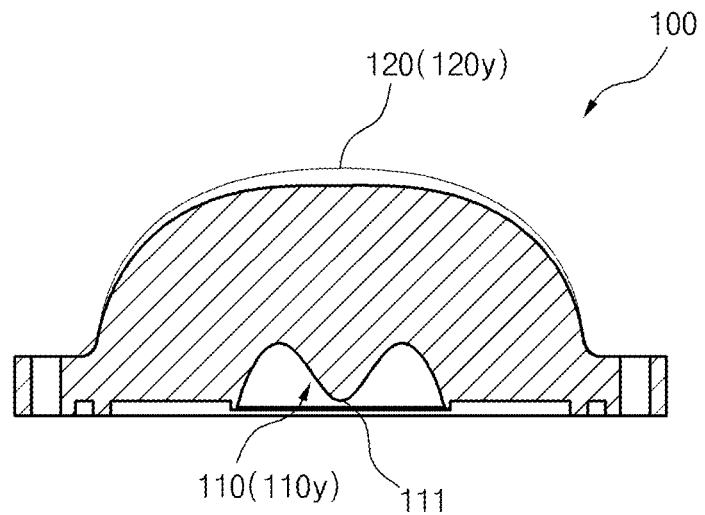
FIG. 5 is a cross-sectional view of the LED light-diffusing lens of the present disclosure which is taken along line Y-Y in FIG. 3.

In accordance with an aspect of the present disclosure, there is provided an LED light-diffusing lens 100 adopting an asymmetric free curved surface equation, in which the LED light-diffusing lens 100 has a body which may be entirely formed of a glass material or a polymer material in a lens structure. The body includes a light-incident inner surface 110 and a light-emitting outer surface 120. The light-incident inner surface 110 may be configured to primarily induce light uniformity of an LED light source by an aspheric surface forming an inner line of the body of the lens structure The light-incident inner surface 110 may be formed as a curved surface recessed in a curved line shape having at least one peak and valley, e.g., as shown in FIGS. 4 and 5, and including an icicle type light adjusting protrusion 111 disposed at the central portion to protrude towards the LED serving as the light source. The light-incident inner surface 110 may be formed to have a generally serpentine shape or substantially sinusoidal shape in each of an X-axis-directional light-incident inner surface 110$x$, e.g., as shown in FIG. 4, and a Y-axis-directional light-incident inner surface 110$y$, e.g., as shown in FIG. 5. The light-emitting outer surface 120 may be configured to induce secondary light diffusion by an aspheric surface forming an outer line of the body to illuminate a target region widely. In some embodiments, the light-emitting outer surface 120 forms a convex curved surface and includes an X-axis-directional light-emitting outer surface 120$x$, e.g., as shown in FIG. 4, and a Y-axis-directional light-emitting outer surface 120$y$, as shown in FIG. 5. The X-axis-directional light-emitting outer surface 120$x$ may be formed as an asymmetric curved surface structure, e.g., as shown in FIG. 4, and the Y-axis-directional light-emitting outer surface 120$y$ may be formed as a convex symmetric curved surface structure e.g., as shown in FIG. 5. In some embodiments, the X-axis-directional light-emitting outer surface 120$x$ may have a shape which may be described as an arcuate shape, and the Y-axis-directional light-emitting outer surface 120$y$ may have a shape which may be described as an extended arcuate shape.

Figure 10:
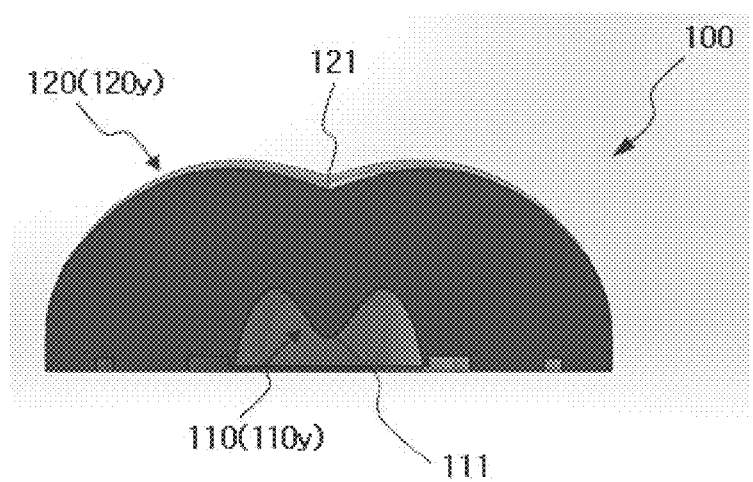
FIG. 10 is a cross-sectional view of the LED light-diffusing lens of the present disclosure which is taken along line Y-Y in FIG. 6.

In accordance with another aspect of the present disclosure, there is provided an LED light-diffusing lens 100 adopting an asymmetric free curved surface equation, in which the LED light-diffusing lens 100 has a body which may be entirely formed of a glass material or a polymer material in a lens structure. The body includes a light-incident inner surface 110 and a light-emitting outer surface 120. The light-incident inner surface 110 may be configured to primarily induce light uniformity of an LED light source by an aspheric surface forming an inner line of the body of the lens structure. The light-incident inner surface 110 may be formed as a curved surface recessed in a curved line shape having at least one peak and valley, e.g., as shown in FIGS. 4 and 5, and including an icicle type light adjusting protrusion 111 disposed at the central portion to protrude towards the LED serving as the light source. The light-incident inner surface 110 may be formed to have a generally serpentine shape or substantially sinusoidal shape in each of an X-axis-directional light-incident inner surface 110$x$, e.g., as shown in FIG. 4, and a Y-axis-directional light-incident inner surface 110$y$, e.g., as shown in FIG. 5. The light-emitting outer surface 120 may be configured to induce secondary light diffusion by an aspheric surface forming an outer line of the body to illuminate a target region widely. In some embodiments, the light-emitting outer surface 120 forms a convex curved surface and includes an X-axis-directional light-emitting outer surface 120x formed as a convex curved surface and having an asymmetric curved surface structure, e.g., as shown in FIG. 4, and a Y-axis-directional light-emitting outer surface 120y formed as a convex symmetric curved surface structure having a concavely recessed valley 121, e.g., as shown in FIG. 10.

Preferably, the light-emitting outer surface 120 may be formed to satisfy a condition that an odd-order term of any one of variables x, y and z should be always 0, when the light-emitting outer surface 120 is expressed by a non-linear free curved surface equation as follows:

$$T = ax + by + cz + dx^2 + ey^2 + fz^2 + gx^3 + hy^3 + iz^3 + jx^4 + ky^4 + lz^4 + \alpha = 1 \quad \text{(Equation)}$$

wherein $\alpha = 0$.

Advantageous Effects

In accordance with embodiments of the present disclosure, an LED light-diffusing lens 100 adopting an asymmetric free curved surface equation is provided and configured to increase the uniformity ratio of illumination with respect to a target region according to light control of the LED serving as a light source. In particular, a highway LED street lamp, which can exhibit light control and illumination efficiency suitable for peripheral environments and lane characteristics of the highway, e.g., in the suburbs or downtown, or a one-way, four-lane or two-lane highway, can be provided. In this way, new markets can be developed.

In some embodiments, an aspheric surface is formed on each of the light-incident surface and the light emitting surface and utilizes an asymmetric free curved surface as much as possible so that a curved surface can be more freely corrected and modified through the adjustment of an aspheric surface coefficient or the like, and numerical design and mathematical design by a free curved surface are enabled so that a fine control can be performed through a numerical control. Through this, precision can be improved according to the light control.

In accordance with embodiments of present disclosure the uniformity ratio of illumination (a level of uniform distribution of light in a predetermined space) with respect to a target region of an illuminated surface of a highway can be increased when it is applied to a highway LED street lamp. Thus, by use of a highway LED street lamp according to the present disclosure, the visibility of a highway can be improved, thereby preventing drivers from becoming tired and helping safe traveling.

In accordance with the present disclosure, a plane light source solution is provided suitable for characteristics of a highway and with an advantage in that a primary lens for primarily adjusting the emitted light of the LED serving as a light source may not be used. Through this, the uniformity ratio of illumination, illumination efficiency, and energy efficiency can be improved and maintenance can be simply performed.

MODE FOR CARRYING OUT THE INVENTION

Hereinafter, embodiments of an LED light-diffusing lens will be described with reference to the accompanying drawings.

Figure 1:
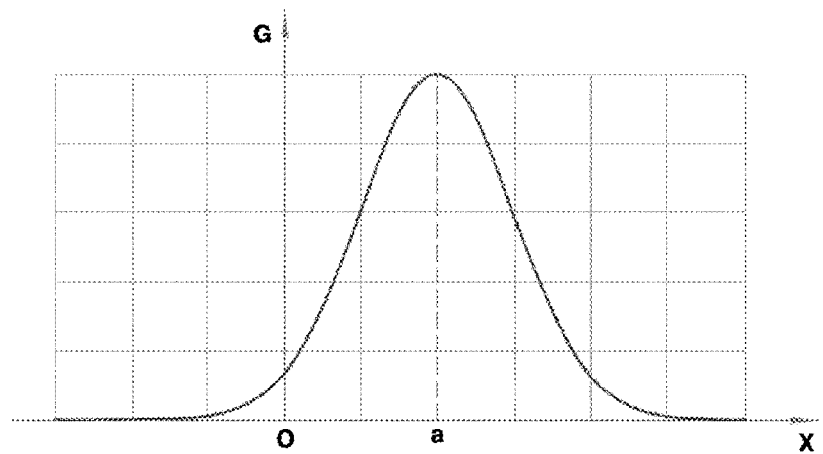
FIG. 1 is a diagram illustrating an ordinary light energy radiation form of an LED light source.
Figure 2:
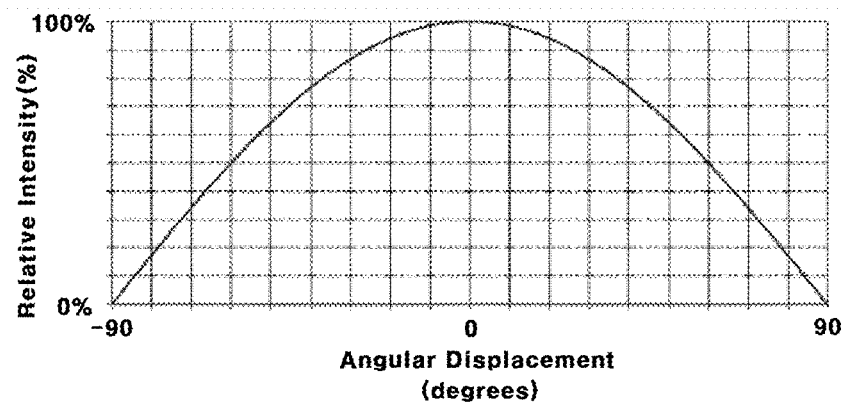
FIG. 2 is a diagram illustrating a radiation form of an LED light source whose light is adjusted by a conventional light-diffusing lens.
Figure 3:
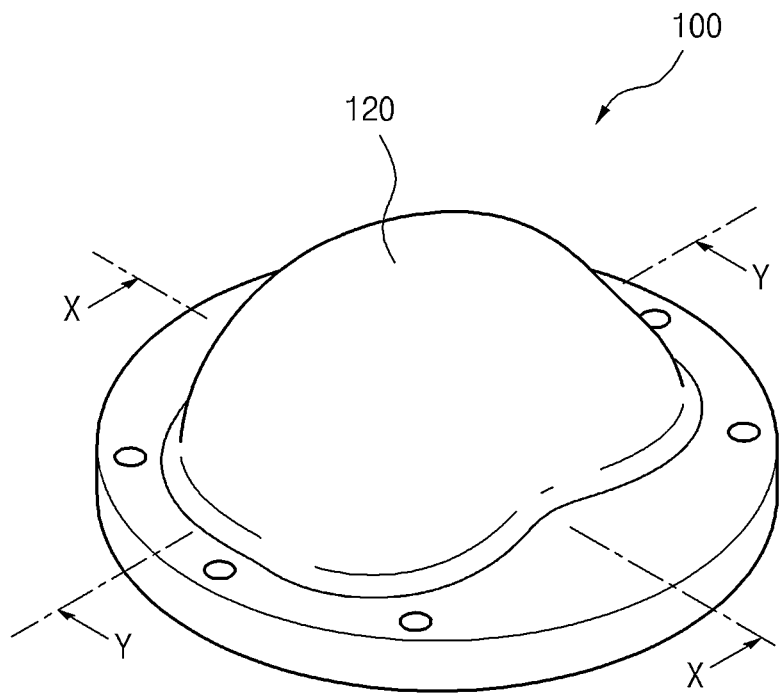
FIG. 3 is a perspective view illustrating an external appearance of an LED light-diffusing lens adopting an asymmetric free curved surface equation according to one embodiment of the present disclosure.

According to an embodiment of the present disclosure, an LED light-diffusing lens 100 adopting an asymmetric free curved surface equation is configured to function as a diffuser of an LED light source which uses an LED as a light source and adopts an asymmetric free curved surface equation, and has a lens structure 100, of which the body is entirely formed of a glass material or a polymer-based material, as illustrated in FIGS. 3-5.

Some examples of materials that may be suitable for use as the polymer-based material may include Poly Carbonate (PC), Poly Methyl Methacrylate (PMMA), or Cyclo Olefin Copolymer (COC), and any one of these may be selected and used.

The lens structure 100 is configured to include a curved light-incident inner surface 110 which forms an inner line of the body and is formed to have an axial symmetric structure in both the X and Y directions, and a curved light-emitting outer surface 120 which forms an outer line of the body and has an asymmetric structure in the X-axis direction and a symmetric structure in the Y-axis direction.

In an embodiment, the LED serving as a light source is disposed below the light-incident inner surface 110.

Since the light-incident inner surface 110 and the light-emitting outer surface 120 are configured as aspheric surfaces, it is preferable that a degree of freedom of curved surface may be maximized by adjusting a curved aspheric surface conic constant and an aspheric surface coefficient so that a radiation route and light distribution can be freely and arbitrarily tuned with respect to emitted light of the LED serving as a light source.

The light-incident inner surface 110 is formed as a curved surface recessed in a curved line shape having at least one peak and valley, and configured to have an icicle type light adjusting protrusion 111 disposed at the central portion to protrude towards the LED serving as the light source, in which the light-incident inner surface 110 is formed to have a generally serpentine shape or substantially sinusoidal shape in each of an X-axis-directional light-incident inner surface 110x, e.g., as shown in FIG. 4, and a Y-axis-directional light-incident inner surface 110y, e.g., as shown in FIG. 5.

The light-incident inner surface 110 serves as a portion where the emitted light of the LED serving as the light source is initially incident and also serves as a portion that functions as a primary diffused light unit with respect to the emitted light of the LED to be capable of adjusting the light distribution, in which, at the central portion, an incident light emitted from the LED and incident on the light-incident inner surface 10 can be subjected to light adjustment by simultaneous action of internal reflection and refraction and at the outside of the central portion, the incident light of the LED can be refracted to be evenly diffused, thereby forming a plane light source.

That is, the light-incident inner surface 110 is a portion configured to perform the light control so as to induce entirely even brightness with respect to the emitted light radiated from the LED serving as the light source, through the actions described above, in which the light-incident inner surface 110 is configured to be capable of finely controlling the light and tuning the light distribution for each field through a numerical control, and primarily deriving the whole light uniformity.

Table 1 below represents aspheric surface data for the light-incident inner surface 110 of the present disclosure.

TABLE 1

Aspheric Surface Data of Light-Incident
Inner Surface of the Present Disclosure

ASPHERIC SURFACE DATA
CONIC POLYNOMIAL ASPHERIC DATA

| | R VALUE | CC | AD | AE | AF | AG |
|---|---|---|---|---|---|---|
| LIGHT-INCIDENT INNER SURFACE | 1.84 | −1.2 | — | — | — | — |
| | — | — | — | — | — | — |
| | — | — | — | — | — | — |

ASPHERIC SURFACE DATA (ASPHERIC SURFACE)

ASP ASR 10-SYMMETRIC GENERAL ASPHERE

| | TERM | COEFFICIENT |
|---|---|---|
| LIGHT-INCIDENT INNER SURFACE | AS0 | 0 |
| | AS1 | 0 |
| | AS2 | −6.1719e−4 |
| | AS3 | 6.7139e−7 |
| | AS4 | 3.2902e−9 |
| | AS5 | −8.1956e−12 |

Table 1 shows that the light-incident inner surface 110 having an aspheric surface of an axial symmetric structure has an aspheric surface curvature (radius), a conic constant, and an aspheric coefficient, which means that the aspheric surface curvature value, the conic constant, and the aspheric surface coefficient can be adjusted, and a radiation route and light distribution can be freely tuned with respect to the emitted light of the LED serving as the light source. The light-incident inner surface 110 has an aspheric surface for implementing light uniformity.

In addition, a high-order aspheric surface which is rotationally symmetric about an optical axis may be generally expressed by Equation 1 as follows.

$$Z = \frac{cvx^2}{1+\sqrt{1-cv^2(1+k)x^2}} + as_2x^4 + as_3^6 + as_4x^8 + as_5 + \ldots \quad \text{(Equation 1)}$$

cv: Curvature (1/Radius)
k: Conic Constant
$as_2, as_3, as_4, as_5, \ldots$ : Aspheric Coefficients Equation 1 is an aspheric surface equation including a conic constant and a plurality of aspheric coefficients, and represents values expressing an aspheric surface shape.

As used herein, upon excluding the aspheric surface coefficients, Equation 1 may represent a spheric surface when K=0, an ellipse when −1<K<0, a paraboloid when K=−1, and a hyperbolic curve when K<−1. This means that when the aspheric surface coefficients, which indicate how much the conic constant is deviated from a curved surface, are applied, the degree of freedom by the aspheric surface may be increased by adjusting the aspheric surface coefficients and the shape of the aspheric surface can be freely designed, and that light adjustment for tuning the whole light uniformity can be primarily performed with respect to the emitted light of the LED serving as the light source through the light-incident inner surface 110.

The light-emitting outer surface 120 is configured to diffuse the light, of which the light uniformity has been primarily derived by the light-incident inner surface 110, so as to secondarily control the light to be capable of illuminating the target region widely, in which the light-emitting outer surface 120 forms a convex curved surface and is formed to have an X-axis-directional light-emitting outer surface 120x which is formed as an asymmetric curved surface structure (which may be described as an arcuate shape), e.g., as shown in FIG. 4, and a Y-axis-directional light-emitting outer surface 120y formed as a convex symmetric curved surface structure (which may be described an extended arcuate shape), e.g., as shown in FIG. 5.

The light-emitting outer surface 120 is a portion that secondarily induces diffusion of the light, of which the light uniformity has been primarily derived by the light-incident inner surface 110, through a refracting action so as to emit the light towards the target region in order to ensure that the light can cover a wider area with respect to the target region on the illuminated surface of the highway and illuminate the target region with even brightness.

In an embodiment, the light-emitting outer surface 120 is formed in a non-linear free curved surface that has an asymmetric structure in the X-axis direction 120x and a symmetric structure in the Y-axis direction 120y. In a numerical analysis manner, the shape of the free curved shape may be expressed by a free curved surface equation T as in Equation 2 as follows.

$$T = ax+by+cz+dx2+ey2+fz2+gx3+hy3+iz3+jx4+ky4+lz4+\alpha=1 \quad \text{(Equation 2)}$$

Here, z becomes an independent variable so that the number of independent variables is three. Thus, T becomes a four-dimensional function including a dependent variable in principle. However, the function is defined as f(x, y, z)=T and deployed into a single equation by performing level set as T=1. When α=0, the function finally expresses a three-dimensional asymmetric free curved surface equation.

In an embodiment, the light-emitting outer surface 120 is preferably configured to satisfy a condition that any one of variables x, y and z should always have an order coefficient of 0 at odd-order terms so that the light-emitting outer surface 120 also takes a form of odd function in a direction perpendicular to a traffic lane and takes a form of even function in the traffic line direction where a bilateral symmetric light distribution is required, thereby considerably improving light distribution efficiency and light diffusion efficiency.

Figure 13:
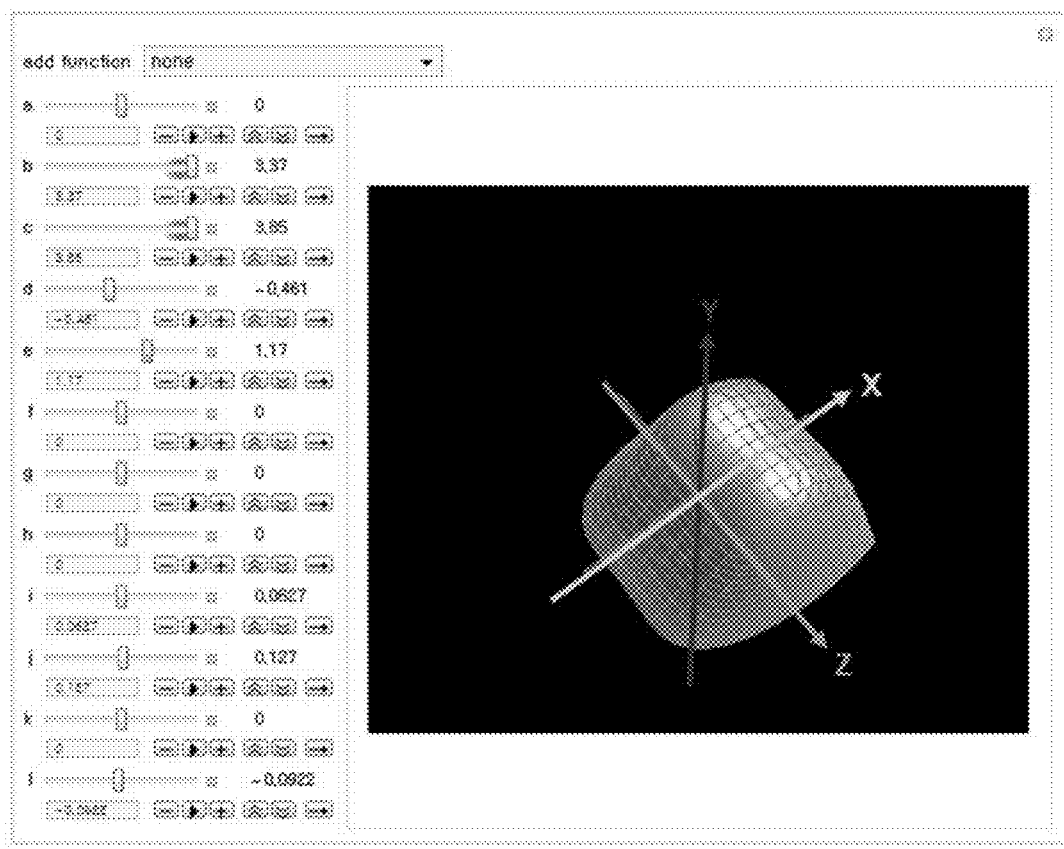
FIG. 13 is a view illustrating simulation data for describing free curve conditions of a light-emitting outer surface in accordance with an embodiment of the present disclosure.

That is, the light-emitting outer surface 120 satisfies a three-dimensional shape restriction condition in Equation 2 above, and may also be expressed as Equation 3 below with reference to left simulation data in FIG. 13.

$$T=0x+3.37y+3.85z+-0.461x^2+1.17y^2+0z^2+0x^3+0y^3+0.0627z^3+0.127x^4+0y^4+-0.0922z^4+0=1 \quad \text{(Equation 3)}$$

Here, referring to the conditions of the above equation, the order coefficients in the first-order term and third-order term (odd-order terms) of variable x represents 0, and the order coefficient in third-order term of variable y represents 0.

Accordingly, it is shown that the light-emitting outer surface 120 satisfies the condition that any one of variables x, y and z should always have an order coefficient of 0 in odd-order terms. This means that the light-emitting outer surface 120 should satisfy the following conditions: the light-emitting outer surface 120 should have an odd function form in a normal direction to the surface of the LED which is a plane light source that only emits light in one direction. The light-emitting outer surface 120 should also have an odd function form in a direction perpendicular to traffic lines for the purpose of light distribution correction which is needed since street lamps are installed away from the traffic lines, and, thus, lighting is installed to be spaced away from the central traffic line by a predetermined distance. On the other hand, the light-emitting outer surface 120 should have an even function form in the traffic line direction where a bilateral symmetric light distribution is required.

The LED light-diffusing lens 100 of the present disclosure having the configuration of the embodiment described above is designed to be suitable for LED street lamps, e.g., for a one-way to a four-lane highway, so that LED street lamps suitable to be installed on wide highways in, for example, Korea, the U.S.A. or Russia, can be provided.

Figure 6:
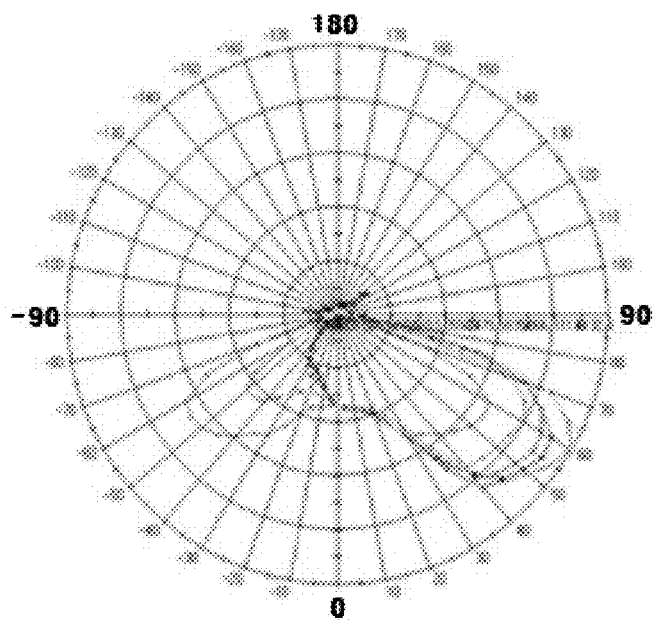
FIG. 6 is radiation pattern data illustrating light distribution curves when an LED light-diffusing lens according to one embodiment the present disclosure is applied.

FIG. 6 is radiation pattern data illustrating light distribution curves in a state where an LED light-diffusing lens embodiment of the present disclosure and an LED serving as a light source are assembled to each other. As illustrated in the radiation pattern of FIG. 6, light distribution having a radiation pattern of dual diffusion processing is provided by the light control of the LED light-diffusing lens according to the present disclosure.

In some embodiments, the LED light-diffusing lens 100 of the present disclosure carry outs light distribution to perform light adjustment of an angle of view of the LED light source to 20 to 40 degrees in the X-axis direction, and to 110 to 130 degrees in the Y-axis direction.

Embodiments of the present disclosure efficiently configure, arrange and design a light-incident inner surface of a symmetric structure and a light-emitting outer surface of an asymmetric structure so that light adjustment and control are performed to have dual angles of view with respect to X and Y axes. The LED light-diffusing lens of the present disclosure may function as a light-diffusing lens useful for a highway LED street lamp which can be installed on, for example, an eight-lane highway having a wider width.

Figure 7:
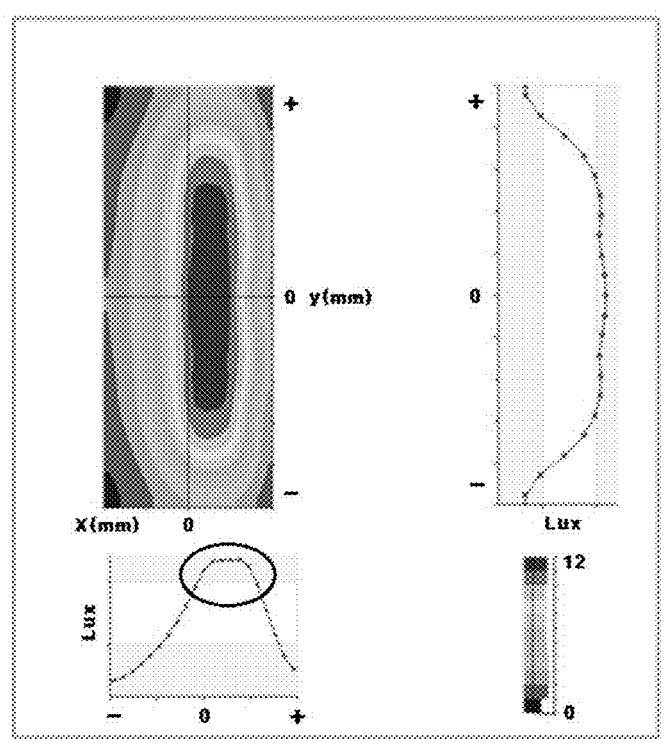
FIG. 7 is light distribution density data illustrating light distribution curves when an LED light-diffusing lens according to one embodiment the present disclosure is applied.

FIG. 7 is data illustrating light distribution densities in a state where an LED light-diffusing lens 100 according to one embodiment the present disclosure and an LED serving as a light source are assembled to each other. The data is simulation data obtained based on an assumption that the LED street lamps are installed at a height of 12 meters and arranged at an interval of 28 meters, e.g., in consideration of the width of a one-way, four-lane highway.

FIG. 7 shows that light adjustment and control are performed in each of the X-axis direction and Y-axis direction, and the LED street lamp takes a plane light source form and has even brightness with respect to a target region of an illuminated surface of the highway street so that a high uniformity ratio of illumination can be exhibited.

In particular, the portion indicated by a circle at the left lower part in FIG. 7 is a portion showing that light uniformity is also obtained in the X-axis direction, which shows that uniform light control is performed by the internal shape of the light-incident inner surface 110 having the icicle type light adjusting protrusion 111. This is a novel feature of the present disclosure.

Meanwhile, in accordance with the present disclosure, the curved surfaces of the X-axis-directional light-emitting outer surface 120x and the Y-axis-directional light-emitting outer surface 120y in the light-emitting outer surface 120 may be changed or modified according to the lane width of the highway and application of the aspheric surface. In other embodiments shown for example in FIGS. 9 and 10, the X-axis-directional light-emitting outer surface 120x may be changed or modified to form as an asymmetric curved surface structure, and the Y-axis-directional light-emitting outer surface 120y may be changed or modified to form a convex symmetric curved surface structure having a concavely recessed valley.

In addition, the X-axis-directional light-emitting outer surface 120x and the Y-axis-directional light-emitting outer surface 120y having an asymmetric curved surface structure formed with a concavely recessed valley 121 at the central portion of the convex curved surface are configured to be capable of more extensively inducing light diffusion of the emitted light of the LED which has been subjected to light control to maintain the light uniformity through the light-incident inner surface 110.

Figure 8:
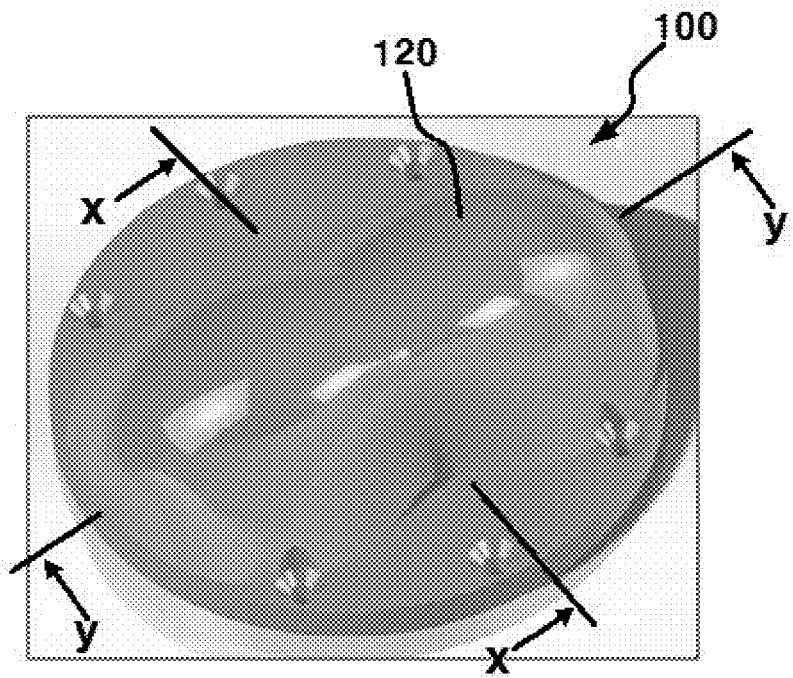
FIG. 8 is a perspective view illustrating an external appearance of an LED light-diffusing lens adopting an asymmetric free curved surface equation according to another embodiment of the present disclosure.
Figure 9:
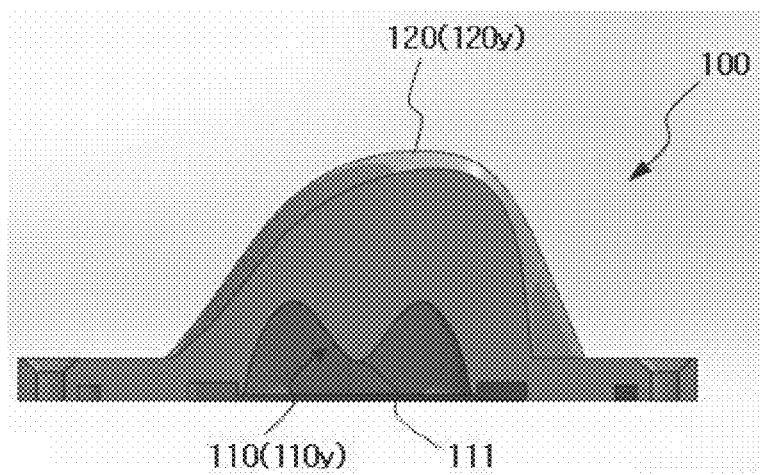
FIG. 9 is a cross-sectional view of the LED light-diffusing lens of the present disclosure which is taken along line X-X in FIG. 6.

FIG. 8 is a view illustrating an external appearance of another embodiment of an LED light-diffusing lens according to the present disclosure having modified curved surfaces of FIGS. 9 and 10.

The LED light-diffusing lens 100 of the present disclosure having the structure of another embodiment described above is designed to be suitable for an LED street lamp for a one-way, two-lane highway, e.g., so that LED street lamps for highways, which are suitable for highways in, for example, Korea, Japan and Europe can be provided.

Figure 11:
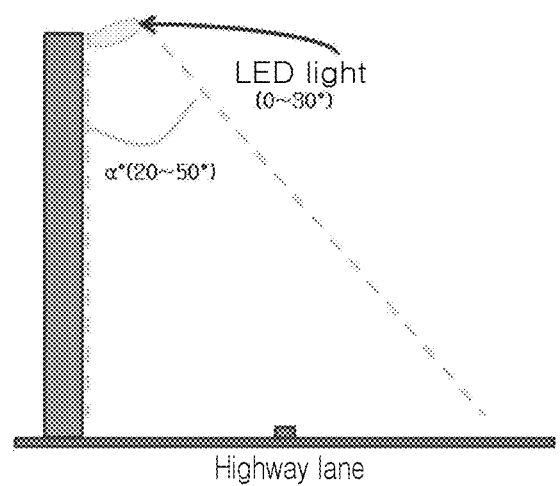
FIG. 11 is a schematic illustrative view illustrating an installed state of an LED lighting including LED light-diffusing lens adopting an asymmetric free curved surface equation according to the present disclosure.

Further, the LED light-diffusing lens 100 adopting an asymmetric free curved surface equation according to the embodiments of the present disclosure has curved surfaces which may be changed or modified by adjusting the aspheric surface conic constant and aspheric surface coefficient of the X-axis-directional light-emitting outer surface 120x of the light-emitting outer surface 120, in which light emitted in the X-axis direction may be flexed and illuminated to form an inclination of 10 to 30 degrees through the light-diffusing lens 100 itself. In some embodiments, as shown for example in FIG. 11, the LED light coupled with an LED serving as a light source may be installed to form an inclination of 0 to 30 degrees with respect to the axis of a vertical pole of the street lamp.

In this way, in accordance with the present disclosure, by performing curved surface adjustment of the X-axis-directional light-emitting outer surface 120x in the light-diffusing lens 100 or installing the light-diffusing lens 100 on the street lamp to be inclined, a wider target region may be covered by uniform brightness, and a highway LED street lamp may be made to be more suitable and useful.

Further, the LED light-diffusing lens 100 adopting an asymmetric free curved surface equation according to an embodiment of the present disclosure may be useful in that it enables adjustment of the arrangement interval of LED lights when installed on a highway by correcting and modifying the size and curved surface shape of the light-emitting outer surface 120 by aspheric surfaces including the X-axis-axial light-emitting outer surface 120x and the Y-axis-directional light-emitting outer surface 120y.

Figure 12:
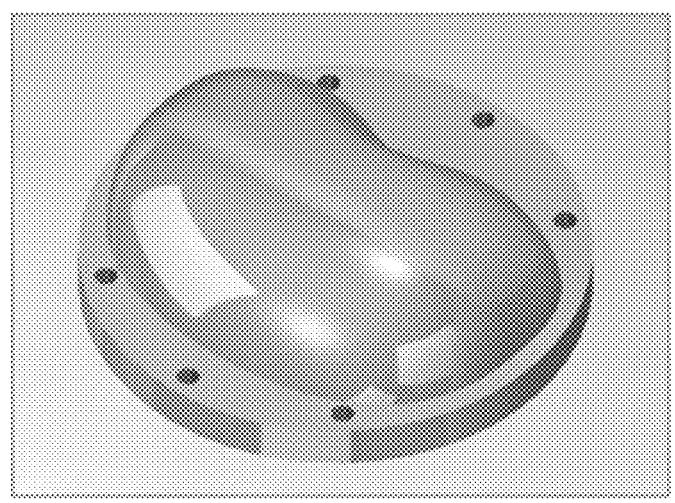
FIG. 12 is an illustrative view illustrating an LED light-diffusing lens adopting an asymmetric free curved surface equation according to still another embodiment of the present disclosure.
Figure 12:
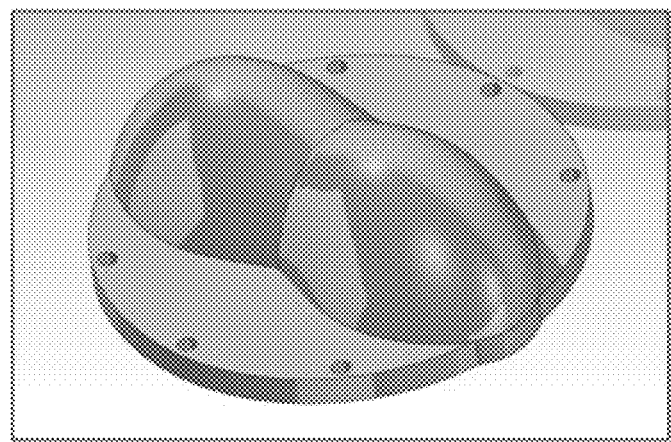

FIG. 12 is a view illustrating an external appearance of an LED light-diffusing lens adopting an asymmetric free curved surface equation according to another embodiment of the present disclosure. FIG. 12 exemplifies a modification of the overall size and curved surface shape of the LED light-diffusing lens, in which a type applicable according to peripheral conditions and a lane width of a highway is illustrated.

Although embodiments have been described in detail with reference to the accompanying drawings for the purpose of illustration and description, it is to be understood that the disclosed processes and apparatus are not to be construed as limited thereby. It will be apparent to those of ordinary skill in the art that various modifications to the foregoing embodiments may be made without departing from the scope of the disclosure.

REFERENCE NUMERALS

100: LED light-diffusing lens
110: light-incident inner surface

110x: X-axis-directional light-incident inner surface 110y: Y-axis-directional light-incident inner surface
120: light-emitting outer surface
120x: X-axis-directional light-emitting outer surface
120y: Y-axis-directional light-emitting outer surface

INDUSTRIAL APPLICABILITY

The present disclosure relates to an LED light-diffusing lens adopting an asymmetric free curved surface equation in which the asymmetric free curved surface equation is applied to improve a uniformity ratio of illumination and to control an LED light source to exhibit all the functions as an LED street lamp to be suitable for peripheral conditions and characteristics of a highway. Thus, the LED light-diffusing lens of the present disclosure is industrially applicable.

What is claimed is:

1. An LED light-diffusing lens adopting an asymmetric free curved surface equation, wherein the LED light-diffusing lens has a body which is formed in a lens structure, the body comprising:
  a light-incident inner surface configured to primarily induce light uniformity of an LED light source by an aspheric surface forming an inner line of the body of the lens structure, wherein the light-incident inner surface is formed as a curved surface recessed in a curved line shape having at least one peak and valley, and including an icicle type light adjusting protrusion disposed at the central portion to protrude towards the LED serving as the light source, wherein the light-incident inner surface includes an X-axis-directional light-incident inner surface and a Y-axis-directional light-incident inner surface;
  a light-emitting outer surface configured to induce secondary light diffusion by an aspheric surface forming an outer line of the body to illuminate a target region widely, wherein the light-emitting outer surface is a convex curved surface and includes an X-axis-directional light-emitting outer surface formed as an asymmetric curved surface structure, and a Y-axis-directional light-emitting outer surface as a convex symmetric curved surface structure;
  wherein the light-emitting outer surface (T) is expressed as a non-linear free curved surface equation as follows:

$T = 0x + 3.37y + 3.85z + -0.461x^2 + 1.17y^2 + 0z^2 + 0x^3 + 0y^3 + 0.0627z^3 + 0.127x^4 + 0y^4 + -0.0922z^4 + \alpha = 1;$ wherein $\alpha$ is 0;
  wherein x is X-axis-directional light-incident outer surface;
  wherein y is Y-axis directional light-incident outer surface;
  wherein z is the Z axis directional light-incident outer surface; and
  wherein the light-emitting outer surface is formed to satisfy a condition that an odd-order term of any one of variables x, y, and z is always 0.

2. The LED light-diffusing lens of claim 1, wherein the light-incident inner surface may have a generally serpentine shape or substantially sinusoidal shape in each of the X-axis-directional light-incident inner surface and the Y-axis-directional light-incident inner surface.

3. The LED light-diffusing lens of claim 1, wherein the body is entirely formed of a glass material or a polymer material.

* * * * *